F. BUCHANAN.
ELECTRICAL RESISTANCE.
APPLICATION FILED JUNE 10, 1919.

1,359,960.

Patented Nov. 23, 1920.
2 SHEETS—SHEET 1.

INVENTOR.
Frank Buchanan
BY
Parsons & Bodell
ATTORNEYS.

F. BUCHANAN.
ELECTRICAL RESISTANCE.
APPLICATION FILED JUNE 10, 1919.
1,359,960.
Patented Nov. 23, 1920.
2 SHEETS—SHEET 2.
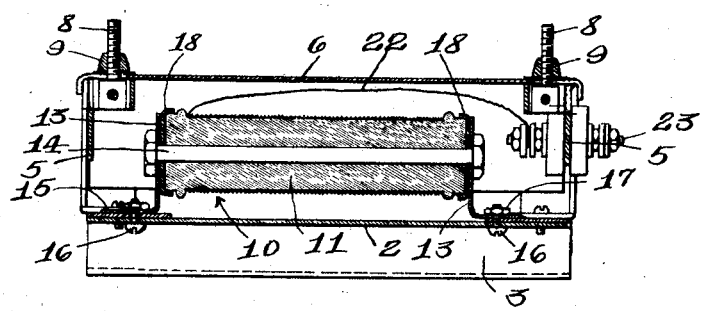
Fig-4-
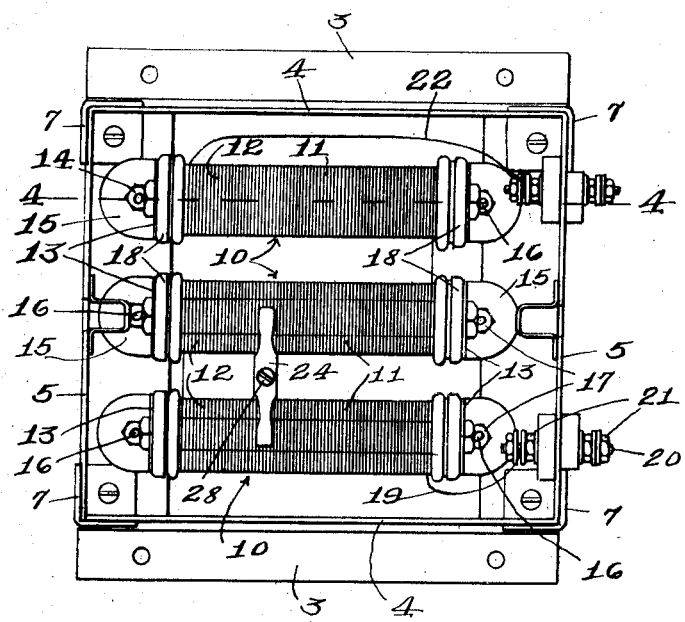
Fig-3-
INVENTOR.
Frank Buchanan.
BY
Parsons & Bodell.
ATTORNEYS.

UNITED STATES PATENT OFFICE.

FRANK BUCHANAN, OF SYRACUSE, NEW YORK.

ELECTRICAL RESISTANCE.

1,359,960.  Specification of Letters Patent.  Patented Nov. 23, 1920.

Application filed June 10, 1919. Serial No. 303,141.

*To all whom it may concern:*

Be it known that I, FRANK BUCHANAN, a citizen of the United States, and a resident of Syracuse, in the county of Onondaga and State of New York, have invented a certain new and useful Electrical Resistance, of which the following is a specification.

This invention has for its object an electrical resistance which is particularly simple and economical in construction and highly efficient and durable in use. It further has for its object a particularly simple and adjustable conductor or bridge for varying the resistance.

The invention consists in the novel features and in the combinations and constructions hereinafter set forth and claimed.

In describing this invention, reference is had to the accompanying drawings in which like characters designate corresponding parts in all the views.

Fig. 3 is a plan view, the cover being removed.

Fig. 4 is a sectional view, on line 4—4, Fig. 3.

Figure 2:
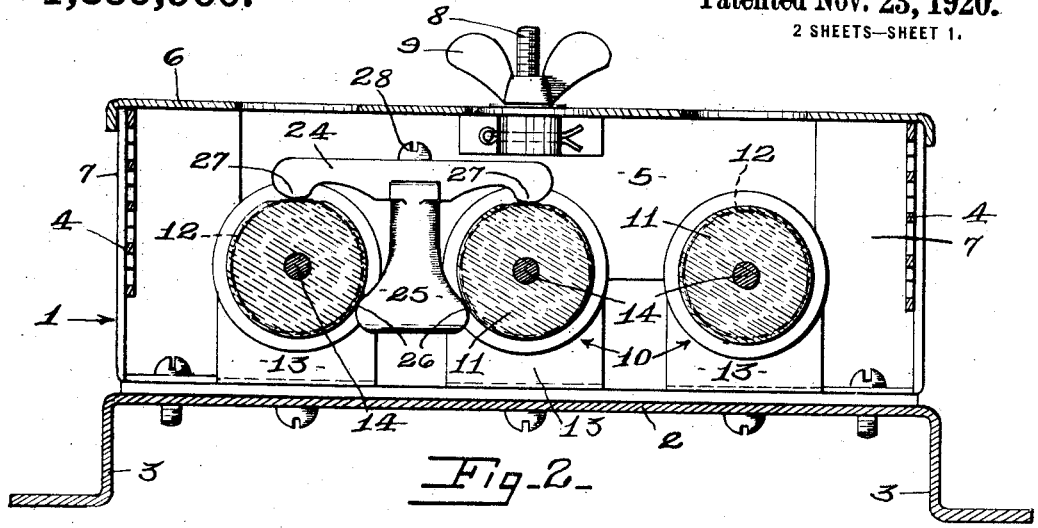
Fig. 2 is a vertical cross sectional view thereof.
Figure 1:
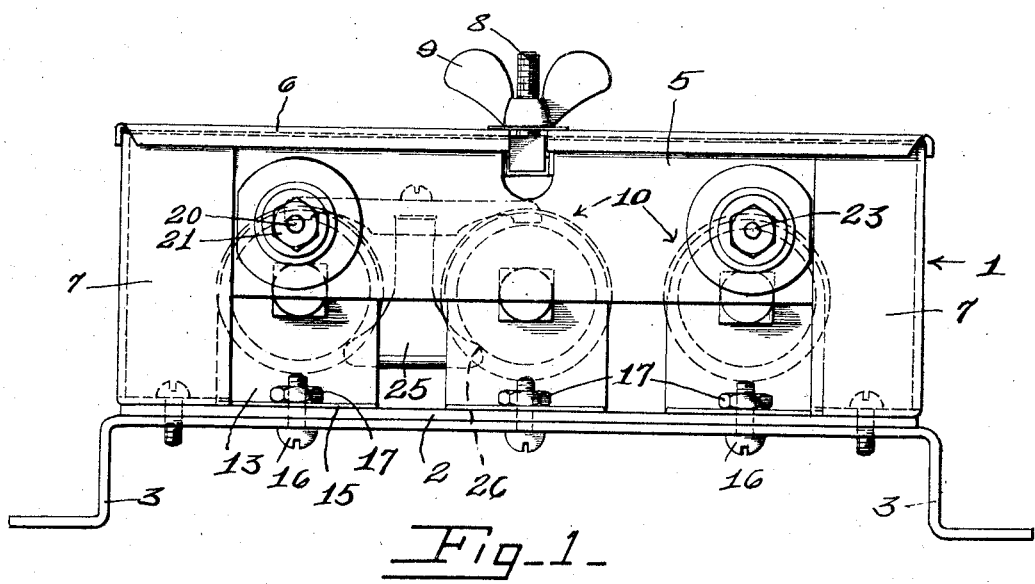
Figure 1 is an end elevation of a resistance embodying my invention.

This resistance comprises generally, a box or casing, resistance units mounted in the box, an adjustable bridge or conductor between the units and means for supporting the bridge in its adjusted position.

1 designates the box which may be of any suitable form, size and construction. As here shown, it includes a bottom or base 2 having suitable feet 3 for connection to a wall or other support, side and end walls 4, 5 rising from the base and a removable cover 6.

The side and end walls 4, 5 have their lower edges spaced apart from the bottom 2 so that the box is open adjacent the bottom and said walls are supported by suitable corner pieces 7. The side walls 4 are preferably perforated to ventilate and cool the coils or resistance units. The top 6 is removable and is held in position by pivot screws 8 having wing nuts 9 thereon.

10 designates the resistance units, the box being here shown as containing three units. Each of these units includes a core or support 11 of insulating material, resistance coils 12 encircling the core, supporting brackets 13 at each end of the core, and fastening means as a bolt 14 extending axially through the core and through the supports or brackets 13, these brackets having feet 15 lying on the bottom 2 opposite the openings between the lower edges of the end walls 5, and the bottom 2 and being secured to the bottom by screws 16 extending through the bottom from the lower side thereof and having nuts 17 at their upper ends which are accessible through said openings. Preferably, the ends of the core are covered by caps 18 and the upright parts of the brackets 13 are pressed against these caps by the head of the bolt 14 or the nut turning on the bolt.

The coil 12 of one of the resistance units is connected by a suitable wire 19 to a terminal 20 supported by one of the end walls 5, this terminal 20 also having binding devices 21, at its inner and outer ends. The coil of the last unit 10 in the box is connected by a wire 22 to a terminal 23 similar to the terminal 20.

24 is the adjustable bridge or conductor for connecting two of the resistance units, this bridge being connected by a suitable support 25 also adjustable along two of the resistance units and engaging and being supported by the same.

As here shown, the support 25 consists of a wedge shaped member extending between two of the units and bearing at 26 on the sides of the same beneath a horizontal plane passing through the centers of the cores, and the bridge 24 bears upon the upper surfaces of the units, these surfaces being flattened in order to expose the wires of the coils 12 to contact with the ends of the bridge 24 which are formed as shown at 27.

The wires usually lie in helical grooves in the cores and the walls of these grooves are cut away or flattened on the top sides of the cores in order to expose the wires.

The means for clamping the bridge 24 to its support 25 comprises a screw 28 extending through the bridge and threading into the support 25.

Obviously, to vary the resistance, that is, cut in or cut out resistance coils, the screw 28 is loosened and the bridge 24 with its support moved along the units and the screw again tightened.

When the screw is tightened the ends 27 clamp onto the flattened surfaces of the units and the wide portion of the wedge shaped support is drawn against the under sides of the unit.

Hence, the bridge and its support are carried entirely by the units and are not connected to the box or any other part and have no means of support other than the units themselves. Although a bridge is shown as provided between the two resistance hinges, obviously bridges may be provided between all of the resistances.

What I claim is:

1. An electrical resistance comprising a pair of resistance units, a bridge connecting said units, a support for the bridge extending between the units and coacting with sides of same, opposite to that at which the bridge engages the units, and means for clamping the bridge and the support together, substantially as and for the purpose specified.

2. In an electrical resistance, the combination of a pair of resistance units, a bridge adjustable along the units, a support for the bridge extending between the units, and means for connecting the bridge to the support, substantially as and for the purpose set forth.

3. In an electrical resistance, the combination of a pair of resistance units, a bridge adjustable along the units, a support for the bridge also adjustable along the units, and comprising a wedge member extending between the units and engaging the same, and means for securing the bridge to the wedge member and drawing the wedge member and the bridge against the units to hold the bridge and the wedge member in operative position, substantially as and for the purpose described.

4. A unit for electrical resistances, comprising a core, coils encircling the core, supports at opposite ends of the core, and a fastening member extending lengthwise of the core and through the supports, substantially as and for the purpose specified.

5. A unit for electrical resistances comprising a core, coils encircling the core, caps at opposite ends of the core, supports engaging the caps and fastening members extending lengthwise of the core through the caps and the supports, substantially as and for the purpose set forth.

6. In an electrical resistance, the combination of a box, resistance units mounted in the box, the walls of the box being open near the bottom, resistance units in the box including supports having feet mounted on the box near the openings in said sides, and fastening members for securing the feet to the bottom of the box, said members being accessible through the open walls of the box, substantially as and for the purpose described.

In testimony whereof I have hereunto signed my name, at Syracuse, in the county of Onondaga, and State of New York, this 19th day of May, 1919.

FRANK BUCHANAN.